(12) United States Patent
Hadian et al.

(10) Patent No.: US 7,010,847 B1
(45) Date of Patent: Mar. 14, 2006

(54) METHOD OF MANUFACTURING A HEAD GIMBAL ASSEMBLY WITH SUBSTANTIALLY ORTHOGONAL TAB, SIDE BEAM AND BASE

(75) Inventors: Jafar Hadian, Cupertino, CA (US); Jamshid Bozorgi, Fremont, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 0 days.

(21) Appl. No.: 10/379,778

(22) Filed: Mar. 4, 2003

Related U.S. Application Data

(62) Division of application No. 09/413,614, filed on Oct. 6, 1999, now Pat. No. 6,538,850.

(51) Int. Cl.
*G11B 5/48* (2006.01)
*G11B 21/16* (2006.01)

(52) U.S. Cl. .................................. 29/603.03; 29/603.04
(58) Field of Classification Search ............. 29/603.03, 29/513, 603.04; 360/245.7, 255, 77.02, 244.9
See application file for complete search history.

(56) References Cited

U.S. PATENT DOCUMENTS

| | | | |
|---|---|---|---|
| 4,912,583 A | 3/1990 | Hinlein | |
| 4,996,616 A | * 2/1991 | Aoyagi et al. | ........... 360/244.9 |
| 5,012,371 A | 4/1991 | Pollard et al. | |
| 5,027,241 A | 6/1991 | Hatch et al. | |
| 5,079,659 A | 1/1992 | Hagen | |
| 5,237,472 A | 8/1993 | Morehouse et al. | |
| 5,243,482 A | 9/1993 | Yamaguchi et al. | |
| 5,333,085 A | 7/1994 | Prentice et al. | |
| 5,367,419 A | 11/1994 | Kazama | |
| 5,422,770 A | 6/1995 | Alt | |
| 5,446,611 A | 8/1995 | Webber | |
| 5,490,027 A | 2/1996 | Hamilton et al. | |
| 5,530,606 A | 6/1996 | Baasch et al. | |
| 5,570,261 A | 10/1996 | Frater et al. | |
| 5,682,279 A | 10/1997 | Imasaki | |
| 5,771,136 A | 6/1998 | Girard | |
| 5,771,139 A | 6/1998 | Lee et al. | |
| 5,838,517 A | 11/1998 | Frater et al. | |
| 5,850,320 A | 12/1998 | Warmka et al. | |
| 5,875,070 A | 2/1999 | Khan et al. | |
| 5,875,072 A | 2/1999 | Brooks, Jr. et al. | |
| 5,877,920 A | 3/1999 | Resh | |
| 5,877,921 A | 3/1999 | Coon et al. | |
| 5,892,637 A | 4/1999 | Brooks, Jr. et al. | |
| 5,995,326 A | 11/1999 | Thayne et al. | |
| 6,067,209 A | 5/2000 | Aoyagi et al. | |
| 6,151,197 A | 11/2000 | Larson et al. | |
| 6,181,525 B1 | 1/2001 | Carlson | |
| 6,233,121 B1 | 5/2001 | Pan | |
| 6,266,212 B1 | 7/2001 | Coon | |

FOREIGN PATENT DOCUMENTS

JP  62-279570  * 12/1987  .............. 360/77.02

OTHER PUBLICATIONS

Henze et al., "Effects of Contrained-Layer Damping on the Dynamics Type 4 In-Line Head Suspension", IEEE Transactions on Magnetics, vol. 26, Issue 5, pp. 2439–2441, Sep. 1990.*

* cited by examiner

*Primary Examiner*—A. Dexter Tugbang
(74) *Attorney, Agent, or Firm*—Joshua C. Harrison, Esq.; Carr & Ferrell LLP

(57) ABSTRACT

Methods of manufacturing a load beam including a flexure/slider assembly are provided. A pre-form of a load beam has a base, a side beam extending from the base and a tab extending from the side beam, all substantially in a common plane. The flexure/slider assembly is attached to the base, then the load beam is bent in two locations, between the tab and the side beam, and between the side beam and the base. After bending, the tab and the side beam are substantially orthogonal to one another and both the tab and the side beam are substantially orthogonal to the base so that the base, side beam, and tab form a partial enclosure around the slider.

33 Claims, 9 Drawing Sheets

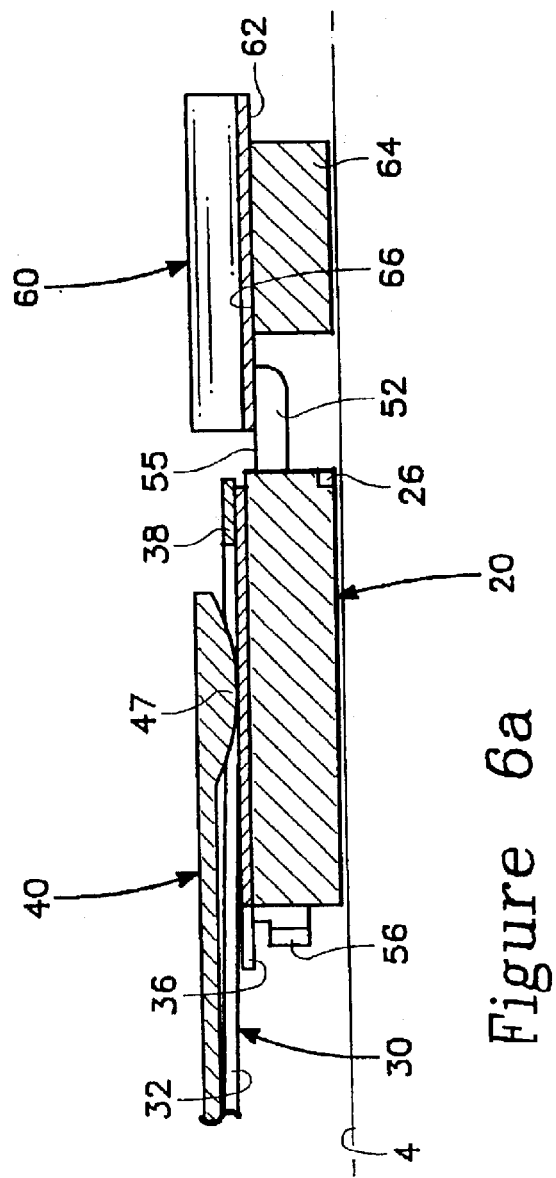
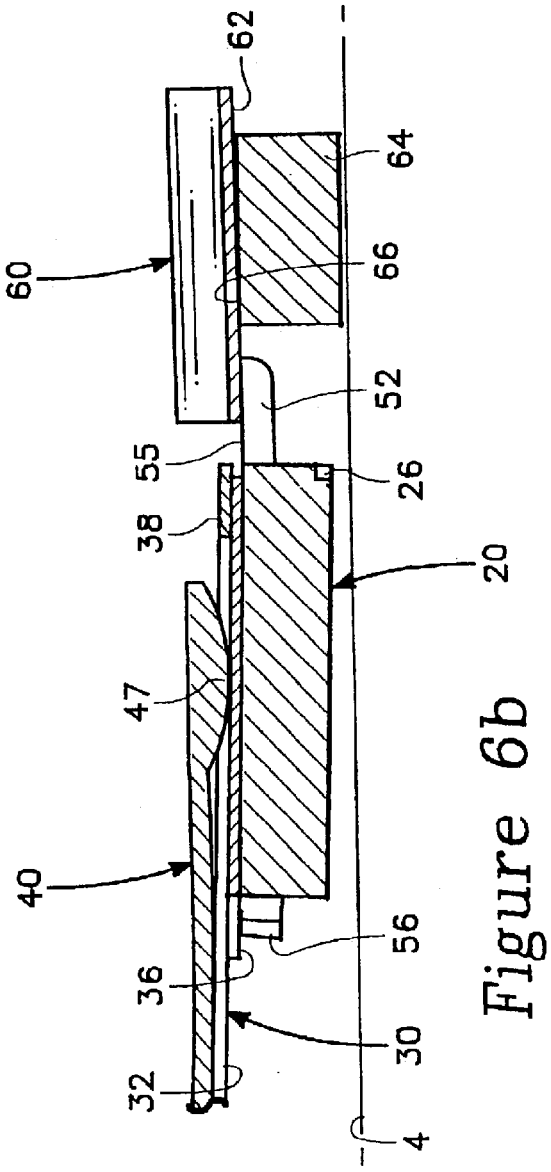
Figure 6a
Figure 6b

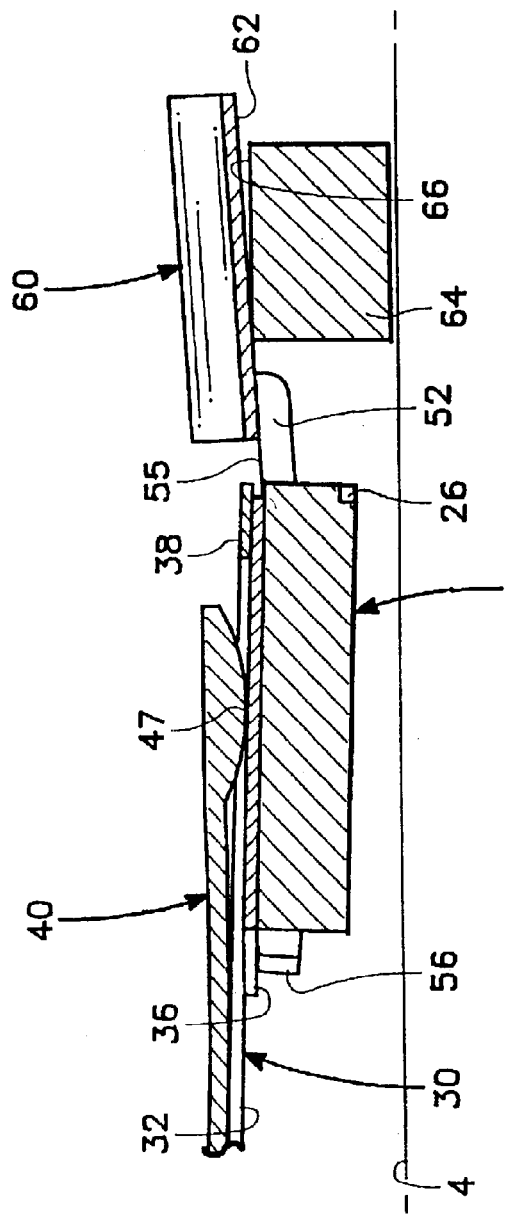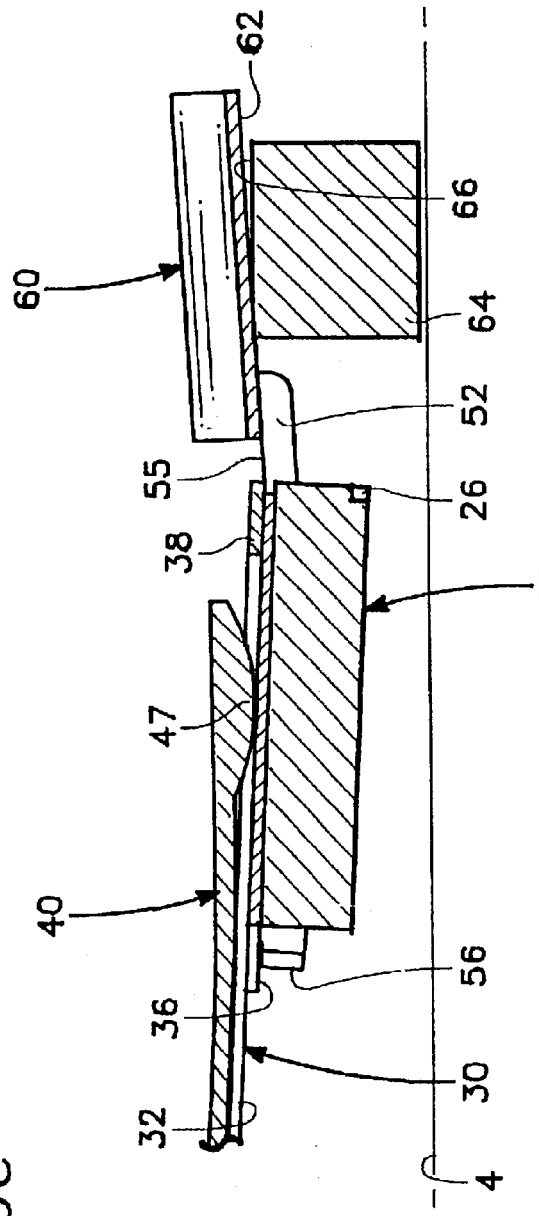

METHOD OF MANUFACTURING A HEAD GIMBAL ASSEMBLY WITH SUBSTANTIALLY ORTHOGONAL TAB, SIDE BEAM AND BASE

This application is a divisional of U.S. application Ser. No. 09/413,614 filed on Oct. 6, 1999, now U.S. Pat. No. 6,538,850, and claims priority therefrom pursuant to 35 U.S.C. §120.

BACKGROUND OF THE INVENTION

As computers have improved over recent years the need for increased data storage has risen dramatically. To meet this need several approaches have been taken to make disk drives capable of storing more data without increasing, and in some cases actually decreasing, their overall size. One approach has been to raise the recording density of the disks by storing more data on the same size disk. Another approach has been to increase the number of disks in the drive's disk stack by spacing the disks closer together.

Increasing the recording density primarily depends on reducing the amount of disk space needed to store each bit of data. A disk drive stores and retrieves data by using a magnetic head which writes data onto the disk by aligning magnetic poles in the magnetic material and reads data by sensing the alignment of previously written poles. The smaller the poles can be made, the more data that can be stored on the disk. However, as the poles are made smaller, the magnetic fields produced by the poles become weaker. Thus, to align and sense the poles, the magnetic head has to be kept very near the surface of the disk.

In order to position magnetic heads sufficiently close to the surface of disks, the heads are typically mounted to air bearing sliders. An air bearing slider is a device which is specifically shaped so that when placed into the airstream existing near the surface of a rotating disk, the slider will provide a lifting force, to cause it to fly just above the disk surface. As magnetic heads are normally much smaller than sliders, they can be mounted to and flown along with the slider. This allows the distance between the magnetic head and the disk surface to be kept relatively small and constant.

Usually, the slider is part of a head gimbal assembly which is attached to an actuator or support arm. As the support arm reciprocates, the slider is moved across the disk surface to precise positions over individual data tracks on the disk. The head gimbal assembly includes a pivot point and a flexure. As the name implies, the flexure is ordinarily a flexible piece of metal, which is stiff enough to urge the slider to maintain a desired position relative to the disk surface, but flexible enough to allow the slider to pitch and roll about the pivot point. It is important that the slider can move about the pivot point so that the slider can freely fly above the disk.

Unfortunately, flying a slider close to the disk surface increases the potential for damage caused by the slider contacting the disk surface. Contact between the slider and disk can result from a shock, jolt or bump to the disk drive, or from the process of loading and unloading the slider between uses. Depending on the flying height of the slider, even a relatively minor shock can displace the slider enough to cause it to collide with the disk surface. Also, an external shock or jolt to the disk drive can cause structural damage to the flexure if the slider is displaced too far about, or from, the pivot point or if the flexure is loaded excessively. Such shocks or jolts can also occur during the manufacturing process when the disk drive is assembled. Damage to the flexure can include dimple separation and bending of the flexure. Dimple separation can occur if the flexure/slider assembly separates too far from the pivot point and deforms the flexure into its plastic range. With dimple separation the flexure no longer can maintain the slider in contact with the pivot point or even if contact can be maintained it cannot be done with the same resiliency.

Thus, to allow for the low flying heights required to achieve higher recording density, an apparatus is needed which will limit or prevent damage caused by shocks, jolts or bumps. However, such an apparatus should also allow for load/unload operations.

To increase recording density and to improve the head-disk interface (to reduce wear to the slider and surface of the disk and to reduce stiction between the slider and disk), load/unload operations have been employed. As the name implies, a load/unload operation involves unloading and loading steps. The "unload" portion of a load/unload operation involves physically lifting and retaining the head gimbal assembly (with the slider) up and away from the surface of the disk. Unloading is done to keep the slider from contacting the surface of the disk when the disk is slowed to a stop. Without unloading, as the disk slows to a stop, the airflow over its surface will lessen and the slider will stop flying. At this point, the slider will drop to contact and test upon the disk surface. Slider contact with the surface of the disk causes both the slider and the disk surface to sustain some wear. Further, with the slider resting on the disk, when the disk is spun up again there will exist stiction between the slider and the surface of the disk. Stiction may cause structural damage to the delicate head gimbal assembly. Stiction causes further wear of the slider and disk surface as well as the load on the motor turning the disk.

During the "load" portion of the load/unload operation the head gimbal assembly is lowered down from its rest towards the disk. With the disk spinning sufficiently, the slider will begin flying as it is lowered to the surface of the disk.

Load/unloading can occur by having a tab on the head gimbal assembly which contacts and is lifted by, a load/unload ramp. As the tab is moved along the ramp it is raised increasingly further up from the disk surface. This in turn raises the slider up from the surface and allows the disk to be stopped without the slider landing and resting on the disk surface.

The other approach to increasing the overall disk storage has been to increase the number of disks in the disk drive's disk stack. However, as additional disks are added to the stack, the spacing between the disks decreases. Therefore, the disk spacing can only be decreased a certain amount. This amount is determined by the height of the portion of the head gimbal assembly which must fit between the disks.

In a disk drive having a load/unload ramp, the space between disks is limited by the height of lifter tabs of the head gimbal assemblies. Specifically, the height of the head gimbal assembly is defined by the amount which the lifter tab projects above the rest of the gimbal assembly. The lifter tab rises relative to the rest of the head gimbal assembly to allow access by the load/unload ramp. As such, the height of the lifter tab directly limits the spacing between disks, which in turn limits the disk stack density. Therefore, a need exists for a head gimbal assembly with a low overall profile.

Thus, a head gimbal assembly with improved head-disk interface is sought which will permit increased data storage by allowing for both greater recording density and closer disk stacking. To provide increased recording density without increasing damage caused by contacts of the slider to the disk caused by external shocks or jolts, the head gimbal assembly must employ an apparatus to limit the slider's motion. Also, the profile of the head gimbal assembly must be low enough to allow the disks in the disk stack to be placed closer together to increase the stack density. However, the head gimbal assembly must still be capable of load/unload operations to reduce slider-disk wear and stiction.

SUMMARY OF THE INVENTION

With the present invention greater data storage can be achieved by employing a combination of a load/unload mechanism and by increasing the stack density of the disk stack. The recording density can be increased by allowing lower flying heights of the slider without increasing contacts between the slider and the disk surface. Contacts between the slider and the disk surface are prevented by limiting the pitching, rolling and vertical displacement of the slider relative to the supporting structure of the head gimbal assembly. Further, contacts can also be avoided by maintaining a positive pitch of the slider during the unloading process. The disk stack density is increased by allowing the disks to be positioned closer together. This closer spacing is achieved by configuring the head gimbal assembly to have a low overall height or profile. This low profile is achieved by reshaping the lifter tab so it is lower but such that it still allows for load and unload operations. The head gimbal assembly is also specifically designed to allow for relatively easy, quick and inexpensive manufacture.

The apparatus of the present invention is embodied in a is head gimbal assembly for use in a disk drive having a load/unload ramp. The head gimbal assembly includes a load beam having a pivot point, a flexure/slider assembly having a flexure and a slider, a limiter mounted between the flexure/slider assembly and the load beam, and a lifter tab extending from the load beam so as to be engagable with the load/unload ramp. The flexure is connected to the load beam and to the slider. The slider is positioned by the flexure to be capable of moving about the pivot point. The limiter is positioned to limit movement of the flexure/slider assembly relative to the load beam. The head gimbal assembly can have a low profile by having the lifter tab extend from the load beam substantially at or below the upper surface of the load beam.

In one embodiment, the head gimbal assembly includes a load beam having a pivot point, two leading edge limiter stops and two trailing edge limiter stops. A flexure/slider assembly includes a flexure and a slider. The slider in turn has a leading edge, a trailing edge and two sides positioned between the leading and trailing edges. The slider is connected to the flexure and resiliently urged by the flexure against the pivot point, such that the slider may pitch and roll about the pivot point and can be displaced downward from the pivot point. The flexure/slider assembly has two leading edge limiter tabs positioned near each side of the slider leading edge to contact the two leading edge limiter stops as the slider leading edge is moved beyond a predefined leading edge range of motion. The flexure/slider assembly also has two trailing edge limiter tabs positioned near the slider trailing edge and each side of the slider, to contact the two trailing edge limiter stops as the slider trailing edge is moved beyond a predefined trailing edge range of motion. This embodiment also includes the lifter tab which extends from the load beam so as to be engagable with the load/unload ramp.

The method of manufacture of the present invention includes: obtaining a load beam having a base, two side beams extending from the base and two tabs extending forward from each side beam, where the base, the side beams and the tabs are substantially in a common plane; attaching a flexure/slider assembly to the load beam; bending the load beam at locations between each tab and each side beam, such that the tabs are moved to a position out of the common plane; and bending the load beam at locations between each side beam and the base, such that the side beams are moved to a position out of the common plane.

DESCRIPTION OF THE DRAWINGS

FIGS. 6a–d is a set of cross-section views showing the head gimbal assembly during an unload operation.

DETAILED DESCRIPTION OF THE PREFERRED EMBODIMENTS

In the preferred embodiments the invention is embodied in a head gimbal assembly (HGA). The head gimbal assembly includes an apparatus for limiting the pitching, rolling and vertical displacement of the slider relative to the supporting structure of the head gimbal assembly. This limiting apparatus reduces the possibility of damage to the head gimbal assembly and disk from collisions between the slider and disk caused by shocks or jolts to the disk drive from external sources and the manufacturing process. Collisions are also avoided as the head gimbal assembly is configured to produce a positive pitch of the slider during load and unload operations. The head gimbal assembly is also configured to have a low overall height. This height reduction is achieved by reducing the height of the lifter tab in a manner which still allows for load and unload operations. The low profile of the head gimbal assembly allows for a significant increase in stack density. That is, the low profile allows for increased data storage as the disks can be spaced closer together, allowing more disks to be held in the same sized disk stack. The head gimbal assembly is also specifically designed to allow for relatively easy, quick and inexpensive manufacture.

Figure 1:
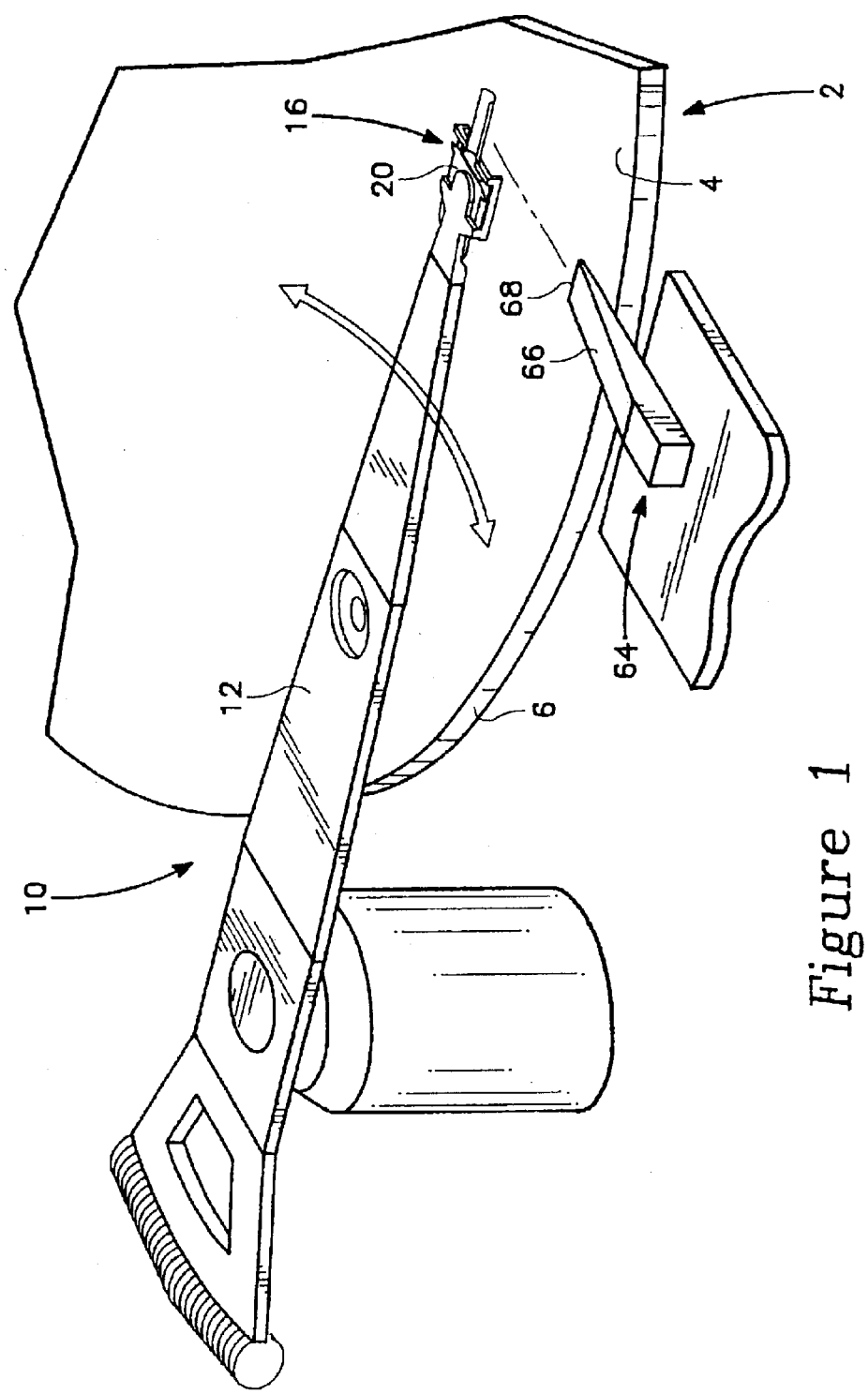
FIG. 1 is a perspective view showing the head gimbal assembly, actuator arm, disk and load/unload ramp.

Description of Relevant Disk Drive Components:

The relevant components of the disk drive include the disk 2 and the head stack assembly (HSA) 10. As shown in FIG. 1, the disk 2 includes a disk surface 4 and a disk outside edge 6. The head stack assembly 10 includes a support arm 12 and a head gimbal assembly or HGA 16. The head stack assembly 10 can move from side to side to position the slider 20 over a desired position on the disk 2. Also shown in FIG. 1 is a load/unload ramp 64, which operates to receive the head gimbal assembly 16 and lift up the head gimbal assembly 16, with the slider 20, well above the disk surface 4.

Description of the Apparatus:

The primary components of the head gimbal assembly 16 includes a slider 20, a flexure 30, and a load beam 40 with a lifter tab 60. These elements are shown in FIGS. 2 and 3.

The slider 20 includes a leading edge 22, a trailing edge 24, a read/write head 26 and sides 28. In the preferred embodiment, the slider 20 is an "air bearing slider". An air bearing slider is a device which is specifically shaped so when it is placed into the airflow existing close to the surface of a rotating disk, the slider will provide a lifting force to cause it to fly above the disk. The slider 20 operates to carry the read/write head 26 over the disk surface 4.

Figure 2:
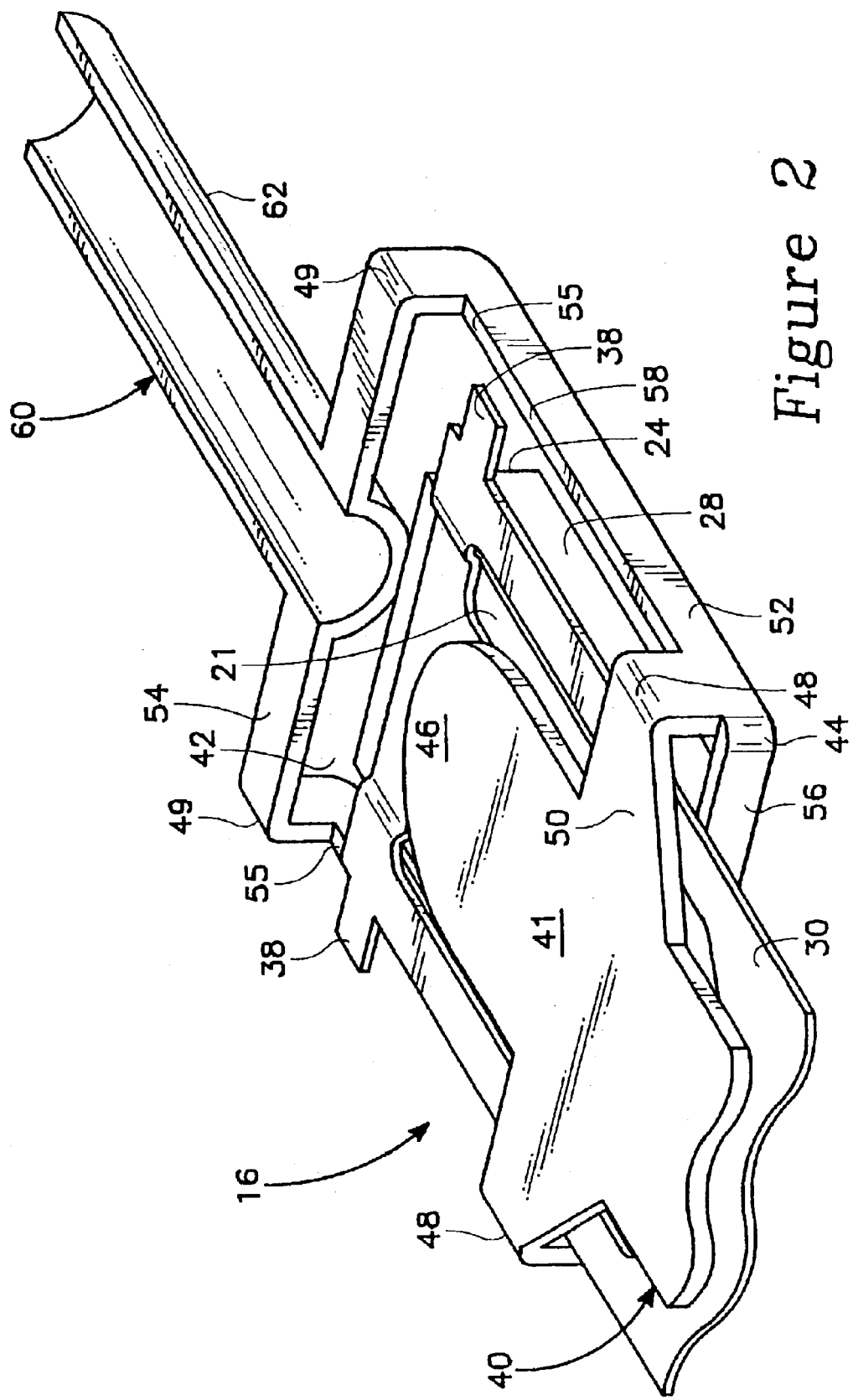
FIG. 2 is a perspective view showing a close-up of the head gimbal assembly.
Figure 3:
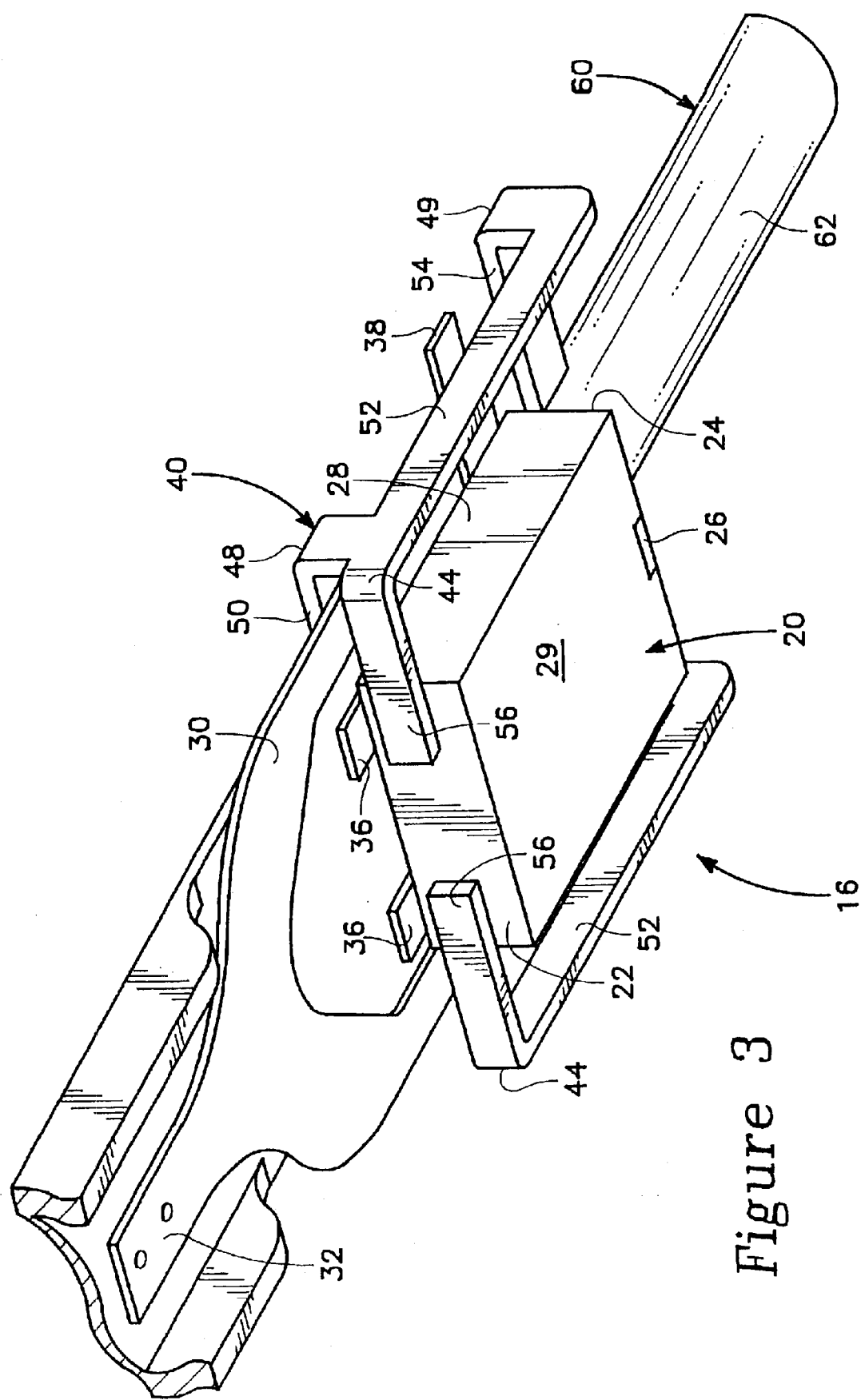
FIG. 3 is a perspective view showing the head gimbal assembly.

As shown in FIGS. 2 and 3, the slider 20 is rectangular in shape. Normally, slider 20 is positioned such that when it is in an airflow, the air generally flows first past the leading edge 22, then past sides 28 and lastly past trailing edge 24. The leading edge 22 and trailing edge 24 are generally kept perpendicular with the airflow and sides 28 generally parallel to the airflow. The slider 20 is attached to the rest of the head stack assembly 10 such that it is free to pivot in both pitch and roll, allowing the slider 20 to be free to fly. The head gimbal assembly 16 typically applies a downward force on the slider 20. In one embodiment this downward force is about 2.5 g.

The flexure 30 is an element that attaches the slider 20 to the rest of the head stack assembly 10. As can be seen in FIG. 2, the flexure 30 is rigidly attached to the slider 20 at the slider's upper surface 21. The flexure 30 is also rigidly mounted to the load beam 40 of the head stack assembly 10 at a flexure mount 32, as shown in FIG. 3. The flexure 30 is comprised of a relatively flexible material which is stiff enough to urge the slider 20 against a pivot point 47 of the load beam 40 and to resiliently urge the slider 20 to a desired attitude relative to the disk surface 4. However, the flexure 30 is also flexible enough that the slider 20 can deflect in pitch and roll as necessary to allow the slider 20 to fly in the airflow above the disk surface 4 when disk 2 is rotating.

As shown in FIG. 3, the flexure 30 is mounted to the load beam 40 forward of the pivot point 47 at the flexure mount 32. In one embodiment, the flexure 30 is attached to the load beam 40 at two weld points positioned along the length of the load beam 40. From its mount 32, the flexure extends back to its attachment to the slider 20. The flexure 30 is mounted to the load beam 40 such that it is deformed sufficiently from an initial shape to continuously urge the slider 20 in a substantially vertical direction up against the pivot point 47. The flexure 30 also urges the slider 20 to have a positive pitch (leading edge up relative to the trailing edge) when taking off from the disk 2.

The flexure 30 includes leading edge limiter tabs 36 and trailing edge limiter tabs 38. As seen in FIGS. 2 and 3, the leading edge limiter tabs 36 extend from the slider 20 at or near its leading edge 22. Likewise, the trailing edge limiter tabs 38 extend out from the slider 20 at or near its trailing edge 24. The limiter tabs 36 and 38 each are positioned above stops of the load beam 40 which act to limit movement of the limiter tabs 36 and 38. With the limiter tabs 36 and 38 positioned at or near each end and at each side of the slider 20, the slider 20 is limited in its movement at each of its four corners.

The load beam 40 provides support to the other elements of the head gimbal assembly 16. The load beam 40 is a relatively rigid member which acts to carry the loads imparted to, and generated by, the head gimbal assembly 16. As shown in FIGS. 2 and 3, the load beam 40 is part of the head gimbal assembly 16. Load beam 40 extends outward from its attachment to the support arm 12 to the slider 20. By actuation of the support arm 12, the load beam 40, carrying the slider 20, allows slider 20 to be positioned across the disk surface 4. Moving the slider 20 across the disk surface 4, allows a read/write head 26, mounted onto the slider 20 (preferably at the trailing edge), to read or write data across the entire usable portion of disk surface 4.

Figure 4:
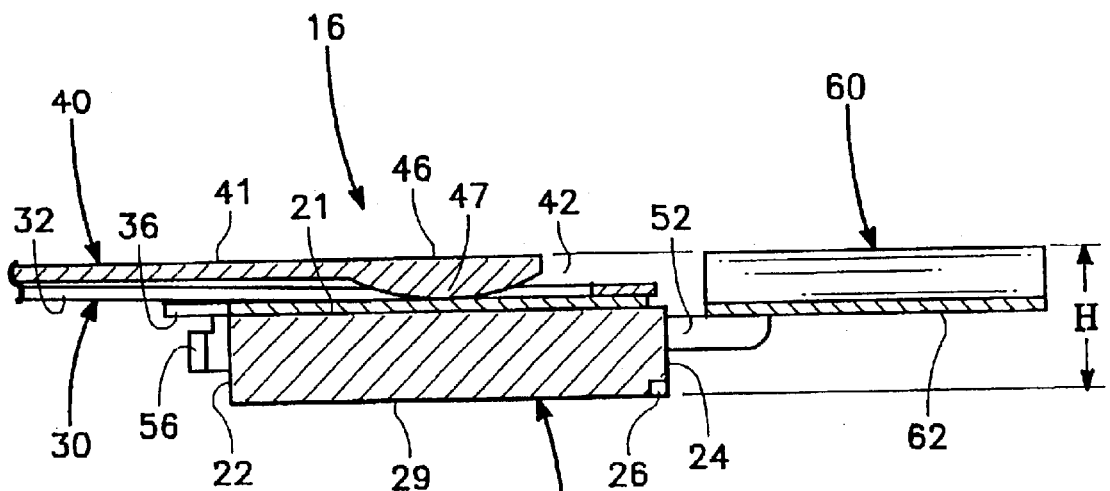
FIG. 4 is a cross-section view showing the head gimbal assembly.

The load beam 40 includes: a pivot point 47, a first bend 44, a base 46, a forward second bend 48, a rear second bend 49, leading cross beam 50, side beams 52, a trailing cross beam 54, leading edge limiter stops 56, trailing edge limiter stops 58 and the lifter tab 60. These components are shown in FIGS. 2, 3 and 4.

The base 46 operates to provide a platform for both the pivot point 47 which is mounted to the underside of the base 46 and for the leading cross beam 50 which extends out horizontally on each side of the base 46. The pivot point 47 can be a dimple formed out of the base 46. The leading cross beam 50 extends far enough outward to extend past each side 28 of the slider 20. At each outside ends of the leading cross beam 50 are the forward second bends 48. The forward second bends 48 angle the beam from a substantially horizontal orientation to a substantially vertical orientation. At the lower end of each of the forward second bends 48 are side beams 52. The side beams 52 run from the forward second bends 48 aft to each of the rear second bends 49. The side beams 52 substantially parallel each of their neighboring slider sides 28. The side beams 52 have sufficiently load capacity to carry the loads of the load beam 40 and to provide sufficient stiffness to prevent or limit deflection of the load beam 40 during load and unload operations. At the trailing edge of the side beams 52 the beams are connected to each of the rear second bends 49. At each of the rear second bends 49 the beam bends back to being substantially horizontal to connect to the trailing cross beam 54. The trailing edge cross beam 54 extends across between both of the rear second bends 49.

As shown in both FIGS. 2 and 3, the base 46, leading cross beam 50, side beams 52 and trailing cross beam 54 define an opening 42. At the forward end of each side beam 52 are located the first bends 44. At each first bend 44 the beam bends to extend in front of and substantially parallel to the slider leading edge 22 to form each of the leading edge limiter stops 56. As can be seen in FIGS. 2 and 3 the limiter stops 56 extend from each first bends 44 inward towards one another. The leading edge limiter stops 56 are each positioned to receive a leading edge limiter tab 36. Receiving both the leading edge limiter tabs 36 acts to limit the downward pitch and translation of the slider 20. Receiving one limiter tab 36 on one limiter stop 56 can act to limit the rotational motion of the slider 20. Also, by contacting the leading edge limiter tabs 36 to the limiter stops 56 loads imparted on the slider 20 can be transferred to the load beam 40 through the limiter stops 56. This protects the flexure 30 from damage (e.g. dimple separation or bending of the flexure) which could otherwise result from excessive displacements of, and/or excessive loads upon, the slider 20 and flexure 30.

Although other embodiments of the load beam 40 can be used, the aforementioned configuration allows for easier manufacture, provides increased stiffness and allows for any possible post-assembly adjustments to the head gimbal assembly 16. This embodiment of the load beam 40 allows the load beam 40 to be manufactured from a single sheet of material which is bent only two times during manufacture.

Figure 5:
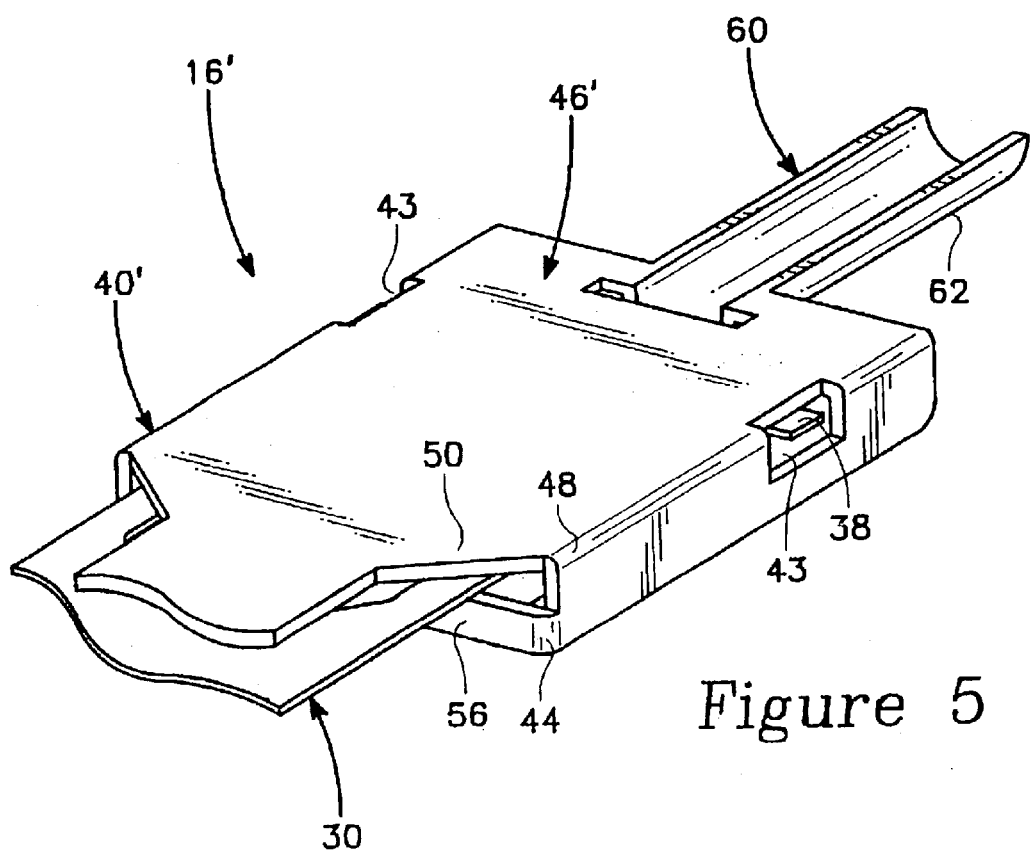
FIG. 5 is a perspective view showing an alternative embodiment of the present invention.

As shown in FIG. 5, an alternative embodiment of the load beam 40 includes eliminating the opening 42. In this embodiment, the base 46' extends across the area of the opening 42, connecting with the leading cross beam 50, the trailing cross beam 54 and the side beams 52. Two small limiter openings 43 are provided in the extended base 46' about the trailing edge limiter tabs 38 to allow for vertical movement of the limiter tabs 38. Because the limiter openings 43 allow the trailing limiter 38 to move within the openings 43, the slider 20 continues to be able to pitch, roll and translate vertically relatively freely within the range defined by the interaction of the trailing edge limiter tabs 38, the limiter openings 43 and the trailing edge limiter stops 58. This alternative embodiment provides the advantage of increased stiffness of the load beam in both the vertical and lateral directions.

Between the load beam 40 and the slider 20 is a pivot point or dimple 47, as shown in FIG. 4. Although the pivot point 47 can be any of a variety of shapes, in one embodiment the pivot point 47 is a semi-spherical shape which allows the slider 20 to pitch and roll about the pivot point 47. The pivot point 47 acts as a gimbal for movement of the slider 20. The pivot point 47 positions the slider 20 and flexure 30 sufficiently below the underside of the load beam 40 to allow enough room to accommodate the deflections associated with the flight of slider 20. Although contacting the pivot point 47, neither the slider 20 nor the flexure 30 are attached to the pivot point 47. Instead, the slider 20 and flexure 30 are resiliently maintained up against the pivot point 47 by deflection (e.g. pre-loading) of the flexure 30.

As noted, the flexure 30 is comprised of a relatively flexible material which resiliently urges the slider 20 in a desired position and attitude and allows the slider 20 to pitch and roll about the pivot point 47 as necessary to allow the slider 20 to fly. In one embodiment, the thickness of flexure 30 is about a third of that of the load beam 40, making the flexure 30 about twenty-seven (27) times more flexible (in a vertical direction) than the load beam 40.

As shown in FIGS. 2 and 3, the leading edge limiter tabs 36 of flexure 30 are positioned above the leading edge limiter stops 56, such that when the slider 20 pitches downward, the limiter tabs 36 contact the stops 56 and the downward pitching motion of the slider 20 is restrained. With the limiter tabs 36 in contact with the stops 56, the loads acting to force the slider 20 to pitch downward are transferred to the load beam 40. This protects the relatively weaker and more easily deformed flexure 30 from damage which might result from the flexure 30 carrying the loads. In other words, transferring the load from the flexure 30 to the load beam 40 protects the flexure 30 from damage due to a displacement beyond the elastic limit of the flexure 30.

Likewise, the trailing edge limiter tabs 38 act to protect the flexure 30 from damage. The trailing edge limiter tabs 38 extend out from the sides of the slider 20 at or near its trailing edge 24. The limiter tabs 38 are positioned above each of the side beams 52, such that as the slider 20 is pitched upwards, the limiter tabs 38 will come in contact with the upper surface 55 of each side beam 52. The portions of each upper surface 55 which receives the limiter tabs 38 are the trailing edge limiter stops 58. The contact of the limiter tabs 38 with the limiter stops 58 retrains the pitching motion of the slider 20. As such, the loads forcing the slider 20 to pitch up are transferred to the load beam 40, protecting the flexure 30 from being damaged from displacements beyond its elastic limit.

The leading edge limiter tabs 36 and trailing edge limiter tabs 38 also function to limit the roll of the slider 20. Since each limiter tab is placed at or near the side of the slider 20, as the slider 20 rolls to one side, that side will drop and the leading edge limiter tab 36 and the trailing edge limiter tab 38 on that side of the slider 20, will contact the leading edge limiter stop 56 and trailing edge limiter stop 58 on that same side. This will restrain the rolling of the slider 20 in that direction. With the limiter tabs 36 and 38 in contact with the stops 56 and 58, the load on the flexure 30 will be transferred to the load beam 40.

Besides limiting the pitching and rolling of the slider 20, the limiter tabs 36 and 38 and limiter stops 56 and 58 also act to limit vertical translations of the slider 20. Since the slider 20 and flexure 30 are resiliently urged against the pivot point 47, but not attached to the pivot point 47, the slider 20 can be displaced in a vertical direction (downward) from the pivot point 47. Such a downward displacement can result from a variety of sources, including an external shock or jolt to the disk drive, handling during manufacture or as a result of the unloading of the head gimbal assembly 16. The downward displacement of the slider 20 is limited by leading edge limiter tabs 36 and the trailing edge limiter tabs 38 contacting the leading edge limiter stops 56 and the trailing edge limiter stops 58 respectfully. Again, as with the pitch and roll limits, the loads on the flexure 30 from the vertical displacement of the slider 20, transfer to the load beam 40 after the limiter tabs 36 and 38 contact the limiter stops 56 and 58.

In an alternative embodiment, the head gimbal assembly 16 can employ three (3) limiter tabs. In one such embodiment, the trailing edge limiter tabs 38 remain as previously described but only one leading edge limiter tab 36 is used. This embodiment continues to limit the pitch, roll and vertical displacement of the slider 20.

As can be seen in FIGS. 2 and 3, extending from the trailing cross beam outward is the lifter tab or load/unload tab 60. The lifter tab 60 operates in conjunction with a load/unload ramp or lifter 64 to allow the head gimbal assembly 16 to be lifted up away from the surface of disk 2 when the head stack assembly 10 is not in use. The action of lifting the head gimbal assembly 16 from the disk surface or "parking" the head stack assembly 10, is advantageous as it protects both the disk 2 and the head gimbal assembly 16 when not in use, from damage caused by external shocks or jolts to the disk drive.

As shown in FIG. 1, the load/unload ramp 64 has an edge 68 and an inclined surface 66 (inclined relative to the surface of disk 2). The inclined surface 66 extends down to near to the disk surface 4. The load/unload ramp 64 must extend low enough such that its edge 68 will slide under at least a portion of the lifter tab 60. The load/unload ramp 64 can be either fixed or movable. In one embodiment the load/unload ramp 64 is fixed in its position, as shown in FIG. 1. The load/unload ramp 64 is positioned at or near the outside edge 6 of the disk 2 in a position to receive the lifter tab 60 when the head stack assembly 10 is swung far enough to contact the load/unload ramp 64. In another embodiment the load/unload ramp 64 is movable. The load/unload ramp 64 can move over the disk surface 4 to receive the load/unload ramp tab 60. The movable load/unload ramp 64 parks the head gimbal assembly 16 by moving under the lifter tab 60 and raising the head gimbal assembly 16 above the disk 2. The movable load/unload ramp 64 releases the head gimbal assembly 16 by moving back towards the outside edge 6 of the disk 2.

As shown in FIG. 3, the lifter tab 60 has typically a semi-circular curved lower surface 62 which facilitates the contact of the lifter tab 60 with the load/unload ramp 64, as well as the movement of the tab 60 along the inclined plane surface 66.

The load/unload ramp 64 allows load/unload operations of the disk drive. As noted, the head gimbal assembly 16 applies a load in a substantially downward direction on the slider 20. This loading helps to keep the slider 20 close to the disk surface 4 and increases the stability of the slider 20 in flight. As the slider 20 is flying in the airflow above disk 2 (rotating to create the airflow), slider 20 creates a lifting force which counteracts the load imparted by the head gimbal assembly 16. As the lifter tab 60 contacts and is received by the load/unload ramp 64, the load of head gimbal assembly 16 is transferred onto the load/unload ramp 64. With the lifter tab 60 resting on the load/unload ramp 64 the head gimbal assembly 16 is unloaded. When the lifter tab 60 is not resting on the load/unload ramp 64 the head gimbal assembly 16 is loaded. When the head gimbal assembly 16 is loaded and the disk 2 spinning, at a rate fast enough to create a sufficient airflow to cause the slider 20 to fly, the lift force from the slider 20 will counter the load of head gimbal assembly 16. Therefore, an unload operation occurs when the head gimbal assembly 16 (via the lifter tab 60) is parked onto the load/unload ramp 64 and a load operation occurs-when the head gimbal assembly 16 is moved off the load/unload ramp 64. To allow for fast load/unload operations the load beam 40 must be sufficiently rigid to avoid excessive deformations.

As can be seen in FIGS. 6a–d, the configuration of the head gimbal assembly 16, including the positioning of the limiter tabs 36 and 38 and their respective stops 56 and 58, provide that the slider 20 will have a positive pitch attitude when the head gimbal assembly 16 is unloaded. A positive pitch of slider 20 during unloading reduces the potential for damage caused by the slider leading edge 22 contacting the disk surface 4. As shown in FIG. 6a, as the unload process begins, the lifter tab 60 contacts the load/unload ramp 64 which begins to apply a substantially vertical force onto the lifter tab 60. This force in conjunction with the load force from the head gimbal assembly 16, causes the load beam to deform slightly. The slider 20 is still in flight and free to pitch and roll about the pivot point 47.

As shown in FIG. 6b, as the lifter tab 60 moves further up the inclined surface 66, the load exerted on the lifter tab 60 increases. This in turn increases the deformation of the load beam 40. At this point the leading edge limiter tabs 36 contact the leading edge limiter stops 58 and the slider 20 is restrained moving past the stop in a negative pitch direction. The trailing edge limiter is not in contact with the trailing edge limiter stop 58. As such, the slider is still free to pitch in a positive direction.

Next, as shown in FIG. 6c, as the lifter tab 60 moves further up inclined surface 66 the load on lifter tab 60 and the resulting deformation of load beam 40 increases. With the slider leading edge 22 held in place by contact of the leading edge limiter 36 with the leading edge limiter stop 56, the relative downward movement of the pivot point 47, caused by the deformation of the load beam 40, forces the slider 20 into a positive pitch attitude. This forced positive pitch prevents the slider 20 from pitching in a negative direction which would otherwise allow the slider leading edge 22 to drop and potentially contact the disk surface 4. At this stage in the unload process the trailing edge limiter 38 is not in contact with the trailing edge limiter stop 58.

As seen in FIG. 6d, the unload process is complete and the load beam 40 is deformed sufficiently to cause the trailing edge limiter 38 to contact the limiter stop 58.

During loading of the head gimbal assembly 16 the process is reversed and the load beam 40 is lowered towards the disk surface 4 with a positive pitch attitude.

As can be seen in FIGS. 2–4, in the preferred embodiment, the lifter tab 60 does not extend above the upper surface 41 of the load beam 40. This provides the lifter tab 60 with a relatively low profile. The lifter tab 60 does not increase the overall head assembly height H, which as seen in FIG. 4, is the distance between the upper surface 41 of the load beam 40 and the lowest point on the bottom 29 of the slider 20. As shown in FIG. 4, the low profile of the lifter tab 60 allows for relatively close stacking of disks 2. Allowing a greater disk stack density and increased overall data storage of the disk drive.

Figure 7A:
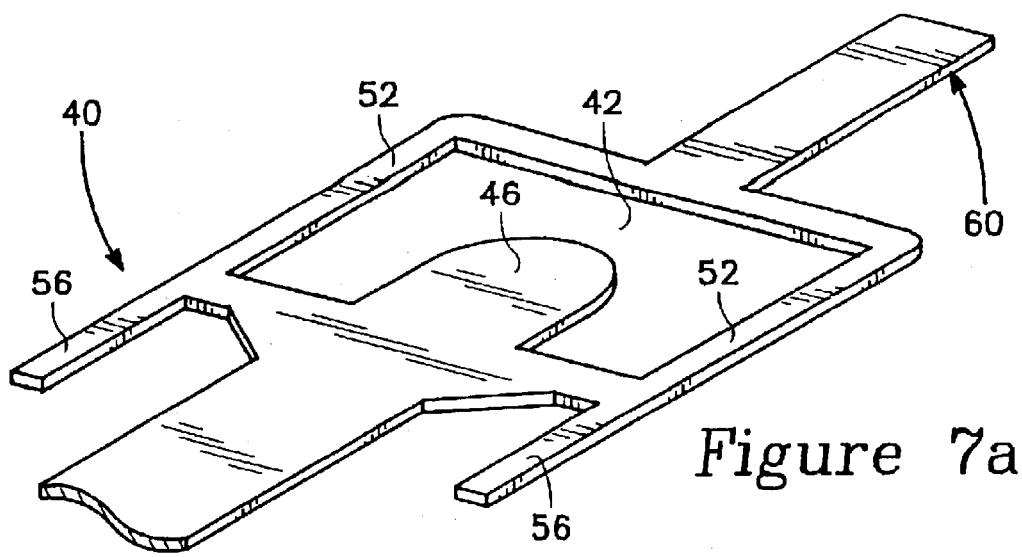
FIGS. 7a–e is a set of perspective views showing the manufacture of the head gimbal assembly.
Figure 7B:
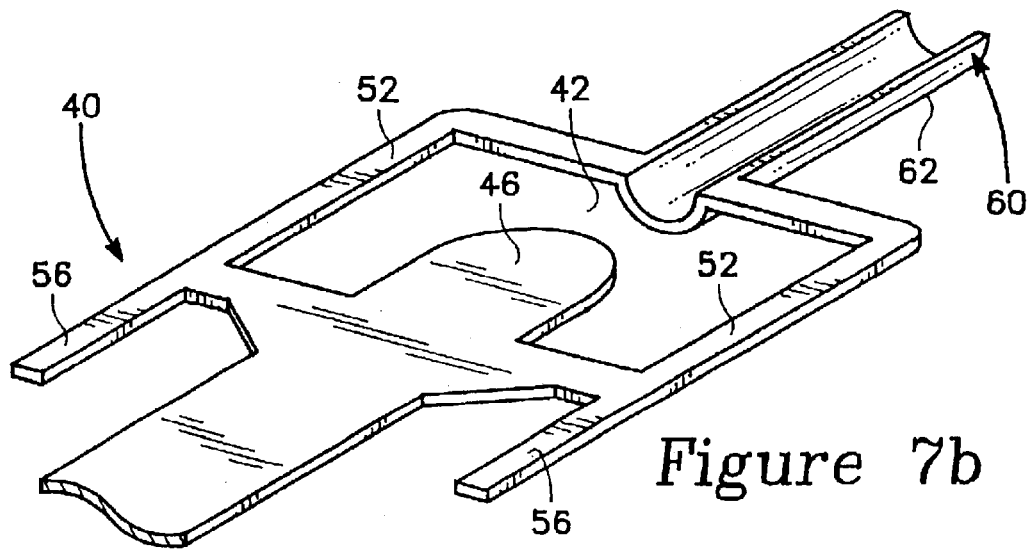
Figure 7C:
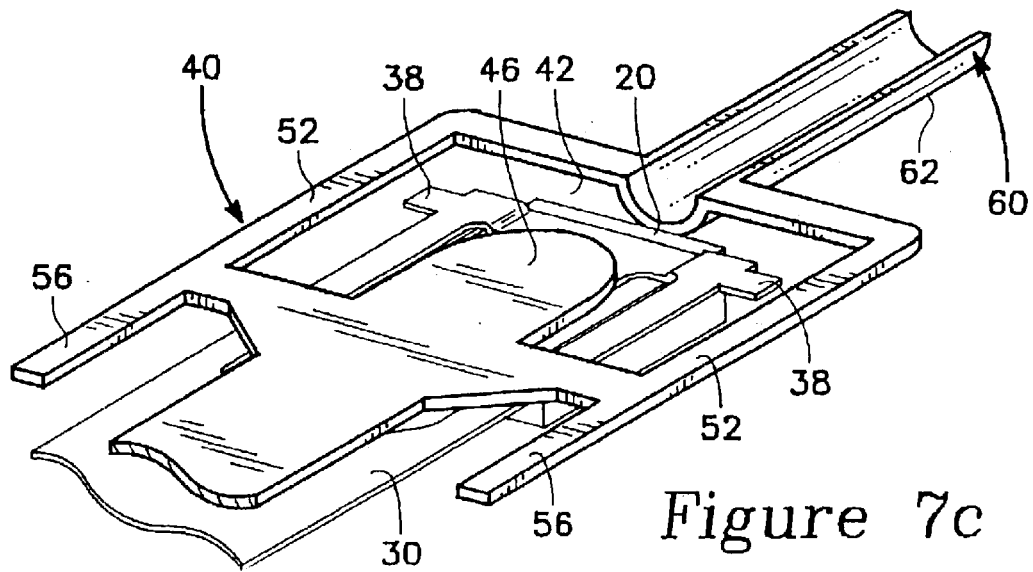
Figure 7D:
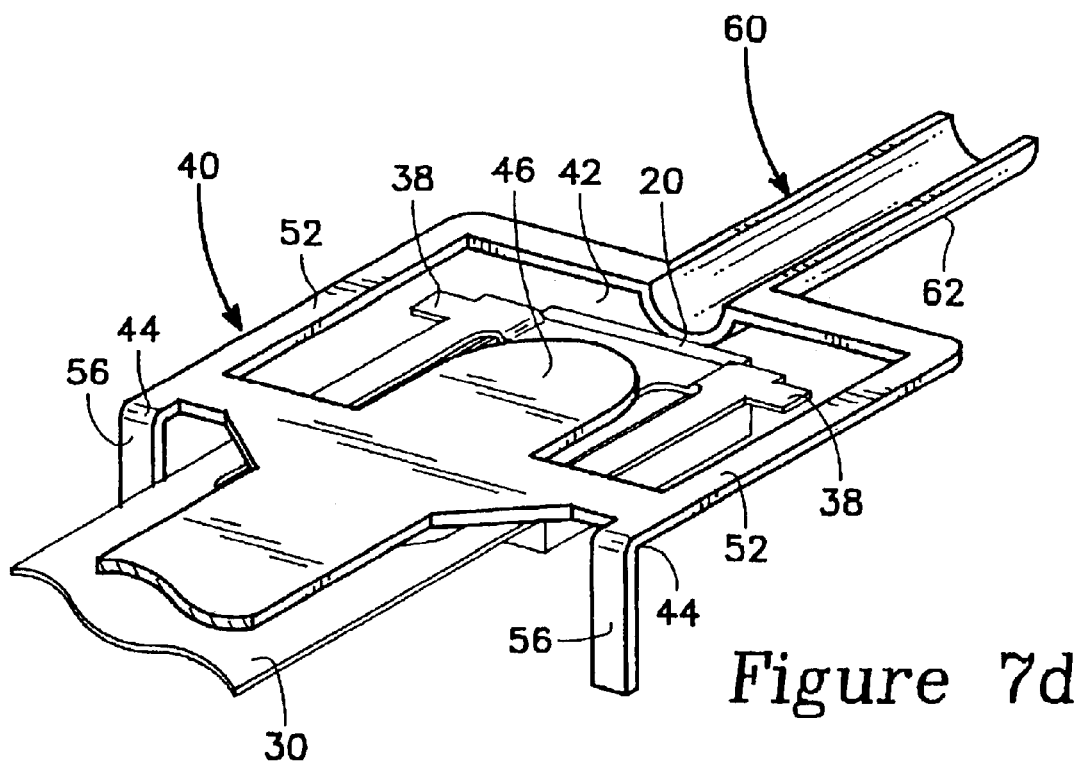
Figure 7E:
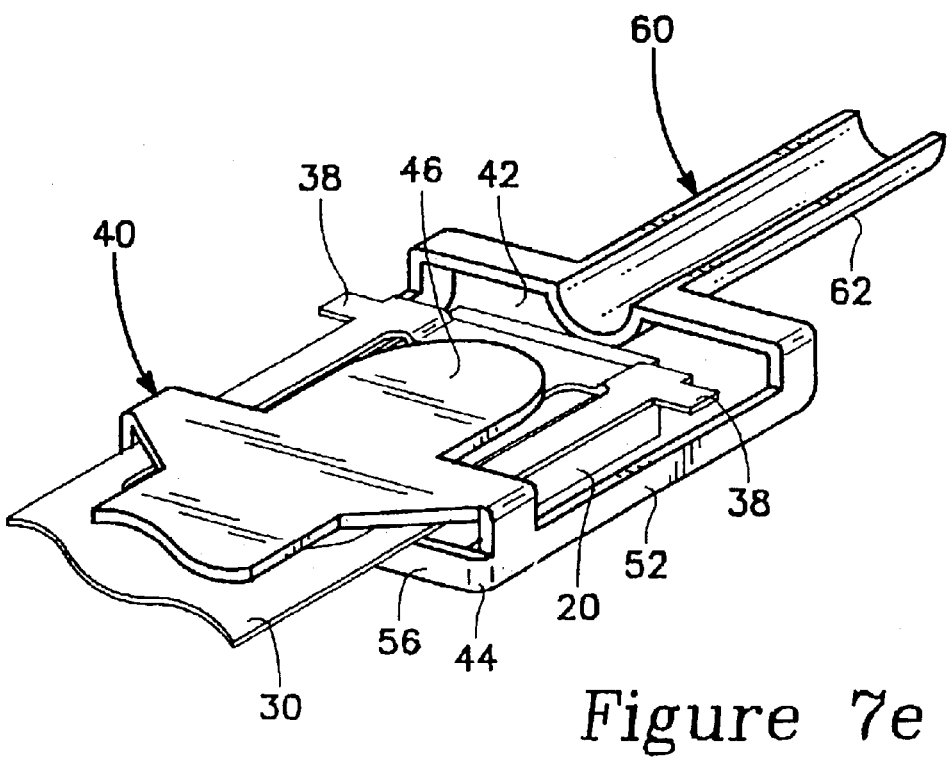
Figure 8:
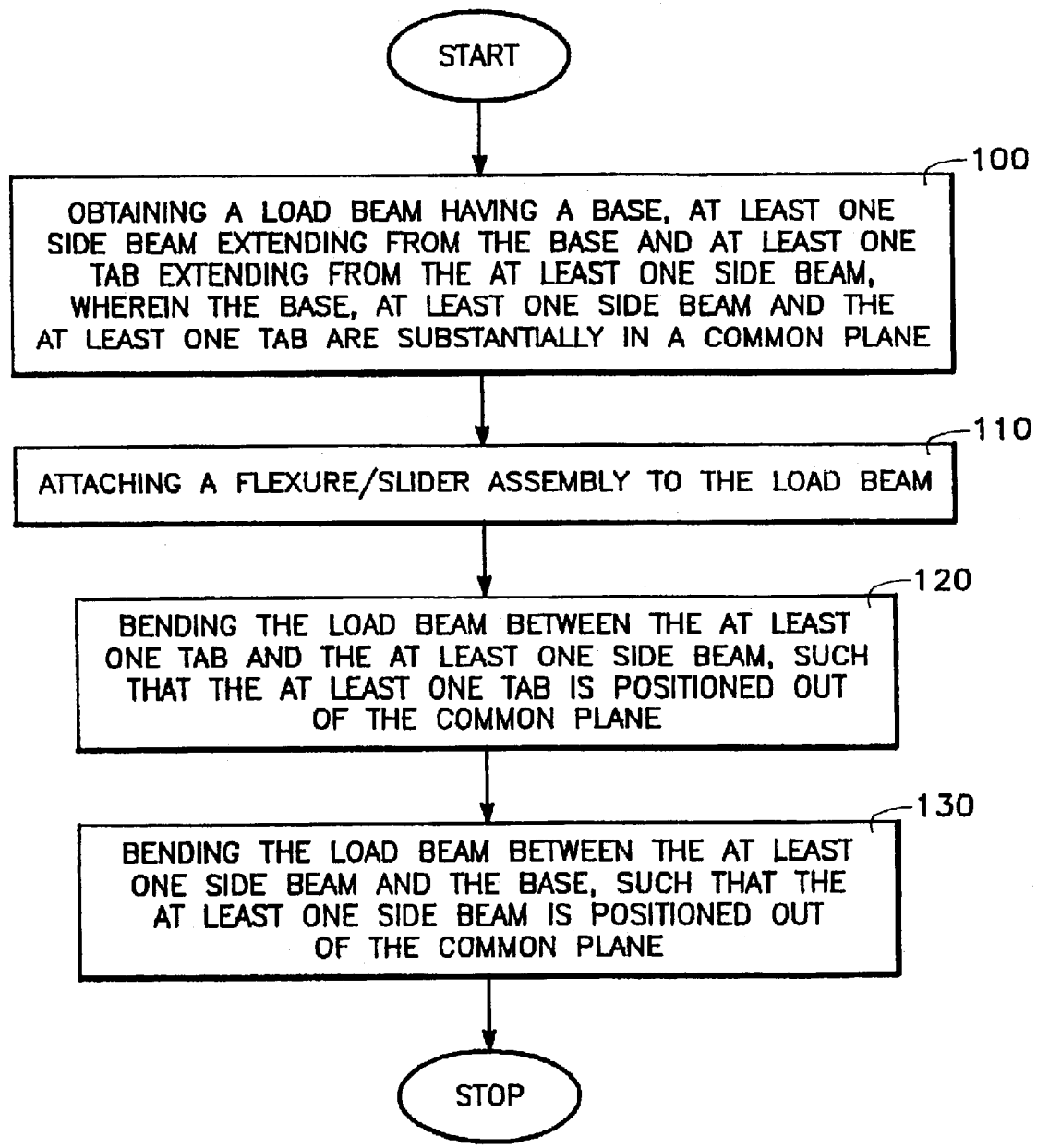
FIG. 8 is a flow chart setting forth the method of manufacture.

Description of Method of Manufacture:

As shown in FIG. 8, the preferred embodiments of the apparatus can be manufactured by a method which includes: obtaining a load beam having a base, at least one side beam extending from the base and at least one tab extending from the at least one side beam, wherein the base, at least one side beam and the at least one tab are substantially in a common plane 100; attaching a flexure/slider assembly to the load beam 110; bending the load beam between the at least one tab and the at least one side beam, such that the at least one tab is positioned out of the common plane 120; and bending the load beam between the at least one side beam and the base, such that the at least one side beam is positioned out of the common plane 130. This method is also shown in FIGS. 7a–e.

The step of obtaining a load beam 100 can be performed in many ways include stamping the load beam 40 out from a sheet of material of an uniform thickness. As seen in FIG. 7a, the load beam 40 can be cut from a single sheet of material, with opening 42 cut from the center and with the side beams 52 and the leading edge limiter stop tabs 56.

Next, the lifter tab 60 can be formed as shown in FIG. 7b. This step involves bending the flat lifter tab 60 into a curved shape to such that during load/unload operations the load/unload ramp 64 can gain access under the lifter tab 60 to raise up the head gimbal assembly 16. The lifter tab 60 is formed so to retain a low profile of the head gimbal assembly 16 by not rising above the upper surface of the load beam 40.

As shown in FIG. 7c, the step of attaching the flexure/slider assembly to the load beam 110 includes attaching the separately manufactured flexure 30 and slider 20 assembly to the load beam 40. This attachment is at flexure mount 32 and can be two welds along the length of the load beam 40. With the flexure 30 and slider 20 attached to the load beam 40, the opening 42 allows access for any possible post-assembly adjustments to elements such as the flexure 30, limiter tabs 36 and 38. Further, in the event the wiring to the read/write head is done after the assembly of the head gimbal assembly 16 (instead of during manufacture of the flexure/slider assembly), the opening 42 allows for easier attachment of the wiring.

The step of bending the load beam between the at least one tab and the at least one side beam 120 includes bending both of the leading edge limiter stops 56. As shown in FIG. 7d, the leading edge limiter stops 56 are bent downward to a substantially vertical orientation at first bends 44. In one embodiment of the method, the bend is made over a specifically designed mandrel placed under the unbent load beam 40 at the location of the first bends 44. In an alternative step, instead of bending the two leading edge limiter stops 56 at the same time, this step can involve two separate bends. First one side of the load beam 40 is bent and then the other.

The step of bending the load beam between the at least one side beam and the base 130 includes bending the load beam is 40 to create both of the side beams 52. As seen in FIG. 7e, to complete the manufacture of the head gimbal assembly 16, the side beams 52 are bent downward to a substantially vertical orientation at each forward second bend 48 and rear second bend 49. In the preferred embodiment, when the load beam 40 is cut, the side beams 52 are made at least wider than the thickness of the load beam. This provides that when the side beams 52 are bent to a vertical orientation, their vertical load capacity and stiffness are greater than if the beam had remained in its original unbent orientation. In one embodiment of the method, the second bends are made over a specifically designed mandrel placed under the unbent load beam 40 at the location of the each forward second bend 48 and rear second bend 49. The bending of the side beams 52 causes the leading edge limiter stops 56 to be rotated up and under the base 46 and forward of the slider 20, as shown in FIG. 7e. With the leading edge limiter stops 56 so positioned by the second bend, they are able to receive the leading edge limiter tabs 36 when the slider 20 is sufficiently displaced by either pitching, rolling, a vertical displacement or a combination thereof. In an alternative step, instead of bending the two side beams 52 at the same time, this step can involve two separate bends. First one side of the load beam 40 is bent and then the other.

While the invention has been described in detail by specific reference to preferred embodiments, it is understood that the above description is not limiting of the disclosed invention and variations and modifications thereof may be made without departing from the true spirit and scope of the invention.

What is claimed is:

1. A method of manufacture comprising:
   A. obtaining a load beam having a base, at least one side beam extending from the base and at least one tab extending from the at least one side beam, wherein the base, at least one side beam and the at least one tab are substantially in a common plane;
   B. attaching a flexure/slider assembly to the load beam;
   C. bending the load beam between the at least one tab and the at least one side beam, such that the at least one tab is positioned out of the common plane, and such that the tab and the side beam are substantially orthogonal to one another; and
   D. bending the load beam between the at least one side beam and the base, such that the at least one side beam is positioned out of the common plane, and such that both the tab and the side beam are substantially orthogonal to the base.

2. The method of claim 1, wherein the step of obtaining the load beam comprises stamping the load beam out of a sheet of material.

3. The method of claim 1, wherein the step of bending the load beam between the at least one tab and the at least one side beam comprises bending the at least one tab in a first direction so the at least one tab is in a position substantially perpendicular to the common plane.

4. The method of claim 3, wherein the step of bending the load beam between the at least one side beam and the base comprises bending the at least one side beam in the first direction so that the at least one side beam is in a position substantially perpendicular to the common plane.

5. The method of claim 1, wherein the load beam further comprises a lower surface and wherein the step of attaching the flexure/slider assembly to the load beam comprises attaching the flexure/slider to the lower surface of the load beam.

6. The method of manufacture of claim 1 wherein the load beam includes a lifter tab portion and the method further comprises deforming the lifter tab portion to form a lifter tab.

7. The method of manufacture of claim 6 wherein the base and the lifter tab portion are integral.

8. The method of manufacture of claim 1 wherein obtaining the load beam includes stamping the load beam from a sheet.

9. The method of manufacture of claim 1 wherein bending the load beam is performed over a mandrel.

10. The method of manufacture of claim 1 wherein attaching the flexure/slider assembly to the load beam is performed before bending the load beam between the at least one tab and the at least one side beam.

11. The method of manufacture of claim 1 wherein bending the load beam between the at least one tab and the at least one side beam is performed before bending the load beam between the at least one side beam and the base.

12. The method of manufacture of claim 1 wherein attaching the flexure/slider assembly to the load beam includes mounting a flexure of the flexure/slider assembly to the load beam forward of a pivot of the load beam, the flexure including a edge limiter tab.

13. The method of manufacture of claim 12 wherein bending the load beam between the at least one side beam and the base includes positioning the at least one side beam beneath the edge limiter tab.

14. The method of manufacture of claim 12 wherein bending the load beam between the at least one side beam and the base includes positioning the flexure between the at least one tab and the base.

15. A method of manufacture comprising:
   A. obtaining a load beam having a base, at least one side beam extending from the base and at least one tab extending from the at least one side beam, wherein the base, at least one side beam and the at least one tab are substantially in a common plane;
   B. attaching a flexure/slider assembly to the load beam;
   C. bending the load beam about a first axis between the at least one tab and the at least one side beam, such that the at least one tab is positioned out of the common plane; and
   D. bending the load beam about a second axis between the at least one side beam and the base, the second axis being substantially orthogonal to the first axis, such that the at least one side beam is positioned out of the common plane.

16. The method of manufacture of claim 15 wherein the load beam includes a lifter tab portion and the method further comprises deforming the lifter tab portion to form a lifter tab.

17. The method of manufacture of claim 16 wherein the base and the lifter tab portion are integral.

18. The method of manufacture of claim 15 wherein obtaining the load beam includes stamping the load beam from a sheet.

19. The method of manufacture of claim 15 wherein bending the load beam is performed over a mandrel.

20. The method of manufacture of claim 15 wherein attaching the flexure/slider assembly to the load beam is performed before bending the load beam between the at least one tab and the at least one side beam.

21. The method of manufacture of claim 15 wherein bending the load beam between the at least one tab and the at least one side beam is performed before bending the load beam between the at least one side beam and the base.

22. The method of manufacture of claim 15 wherein attaching the flexure/slider assembly to the load beam includes mounting a flexure of the flexure/slider assembly to the load beam forward of a pivot of the load beam, the flexure including a edge limiter tab.

23. The method of manufacture of claim 22 wherein bending the load beam between the at least one side beam and the base includes positioning the at least one side beam beneath the edge limiter tab.

24. The method of manufacture of claim 22 wherein bending the load beam between the at least one side beam and the base includes positioning the flexure between the at least one tab and the base.

25. A method of manufacture comprising:
  A. obtaining a load beam having a base, at least one side beam extending from the base and at least one tab extending from the at least one side beam, wherein the base, at least one side beam and the at least one tab are substantially in a common plane;
  B. attaching a flexure/slider assembly to the load beam;
  C. after attaching the flexure/slider assembly, bending the load beam between the at least one tab and the at least one side beam, such that the at least one tab is positioned out of the common plane; and
  D. bending the load beam between the at least one side beam and the base, such that the at least one side beam is positioned out of the common plane.

26. The method of manufacture of claim 25 wherein the load beam includes a lifter tab portion and the method further comprises deforming the lifter tab portion to form a lifter tab.

27. The method of manufacture of claim 26 wherein the base and the lifter tab portion are integral.

28. The method of manufacture of claim 25 wherein obtaining the load beam includes stamping the load beam from a sheet.

29. The method of manufacture of claim 25 wherein bending the load beam is performed over a mandrel.

30. The method of manufacture of claim 25 wherein bending the load beam between the at least one tab and the at least one side beam is performed before bending the load beam between the at least one side beam and the base.

31. The method of manufacture of claim 25 wherein attaching the flexure/slider assembly to the load beam includes mounting a flexure of the flexure/slider assembly to the load beam forward of a pivot of the load beam, the flexure including a edge limiter tab.

32. The method of manufacture of claim 31 wherein bending the load beam between the at least one side beam and the base includes positioning the at least one side beam beneath the edge limiter tab.

33. The method of manufacture of claim 31 wherein bending the load beam between the at least one side beam and the base includes positioning the flexure between the at least one tab and the base.

* * * * *